United States Patent
Tan et al.

(10) Patent No.: US 11,256,754 B2
(45) Date of Patent: Feb. 22, 2022

(54) SYSTEMS AND METHODS FOR GENERATING NATURAL LANGUAGE PROCESSING TRAINING SAMPLES WITH INFLECTIONAL PERTURBATIONS

(71) Applicant: salesforce.com, inc., San Francisco, CA (US)

(72) Inventors: Samson Min Rong Tan, Singapore (SG); Shafiq Rayhan Joty, Singapore (SG)

(73) Assignee: salesforce.com, inc., San Francisco, CA (US)

( * ) Notice: Subject to any disclaimer, the term of this patent is extended or adjusted under 35 U.S.C. 154(b) by 96 days.

(21) Appl. No.: 16/869,903

(22) Filed: May 8, 2020

(65) Prior Publication Data

US 2021/0173872 A1 Jun. 10, 2021

Related U.S. Application Data

(60) Provisional application No. 62/945,647, filed on Dec. 9, 2019.

(51) Int. Cl.
  *G06F 16/9032* (2019.01)
  *G06F 40/284* (2020.01)
  *G10L 15/18* (2013.01)
  *G10L 15/16* (2006.01)

(52) U.S. Cl.
  CPC ...... *G06F 16/90332* (2019.01); *G06F 40/284* (2020.01); *G10L 15/16* (2013.01); *G10L 15/1822* (2013.01)

(58) Field of Classification Search
  None
  See application file for complete search history.

(56) References Cited

U.S. PATENT DOCUMENTS

| | | | |
|---|---|---|---|
| 5,323,316 A | * | 6/1994 | Kadashevich ........ G06F 40/253 704/9 |
| 8,161,429 B1 | | 4/2012 | Chan et al. |
| 9,489,373 B2 | * | 11/2016 | Simard .................. G06F 40/30 |
| 10,282,663 B2 | | 5/2019 | Socher et al. |
| 10,346,721 B2 | | 7/2019 | Albright et al. |
| 10,474,709 B2 | | 11/2019 | Paulus |
| 10,521,465 B2 | | 12/2019 | Paulus |
| 10,542,270 B2 | | 1/2020 | Zhou et al. |

(Continued)

OTHER PUBLICATIONS

Szabo et al., Optimization of the morpher morphology engine using knowledge base reduction techniques, Computing and Informatics, vol. 38, 2019, pp. 963-985 (Year: 2019).*

(Continued)

*Primary Examiner* — Linda Wong
(74) *Attorney, Agent, or Firm* — Haynes and Boone, LLP

(57) ABSTRACT

Embodiments described herein provide systems and methods for generating an adversarial sample with inflectional perturbations for training a natural language processing (NLP) system. A natural language sentence is received at an inflection perturbation module. Tokens are generated from the natural language sentence. For each token that has a part of speech that is a verb, adjective, or an adverb, an inflected form is determined. An adversarial sample of the natural language sentence is generated by detokenizing inflected forms of the tokens. The NLP system is trained using the adversarial sample.

20 Claims, 5 Drawing Sheets

(56) References Cited

U.S. PATENT DOCUMENTS

| | | | |
|---|---|---|---|
| 10,558,750 B2 | 2/2020 | Lu et al. | |
| 10,565,305 B2 | 2/2020 | Lu et al. | |
| 10,565,306 B2 | 2/2020 | Lu et al. | |
| 10,565,318 B2 | 2/2020 | Bradbury | |
| 10,565,493 B2 | 2/2020 | Merity et al. | |
| 10,573,295 B2 | 2/2020 | Zhou et al. | |
| 10,592,767 B2 | 3/2020 | Trott et al. | |
| 2007/0203688 A1* | 8/2007 | Fuji | G06F 40/40 704/2 |
| 2011/0063231 A1* | 3/2011 | Jakobs | G06F 3/04883 345/173 |
| 2012/0296633 A1* | 11/2012 | Chalabi | G06F 40/44 704/4 |
| 2013/0197896 A1* | 8/2013 | Chalabi | G06F 40/268 704/2 |
| 2013/0262501 A1* | 10/2013 | Kuchmann-Beauger | G06F 16/9024 707/769 |
| 2014/0180728 A1* | 6/2014 | Biddle | G06F 16/3329 705/4 |
| 2015/0066484 A1* | 3/2015 | Nathan | G06F 40/35 704/9 |
| 2016/0350653 A1 | 12/2016 | Socher et al. | |
| 2017/0024645 A1 | 1/2017 | Socher et al. | |
| 2017/0032280 A1 | 2/2017 | Socher | |
| 2017/0140240 A1 | 5/2017 | Socher et al. | |
| 2017/0228372 A1* | 8/2017 | Moreno | G06F 16/3329 |
| 2017/0242915 A1* | 8/2017 | Torisawa | G06F 16/00 |
| 2017/0323009 A1* | 11/2017 | Byron | G06F 16/9535 |
| 2017/0323011 A1* | 11/2017 | Byron | G06F 16/3344 |
| 2018/0096219 A1 | 4/2018 | Socher | |
| 2018/0121787 A1 | 5/2018 | Hashimoto et al. | |
| 2018/0121788 A1 | 5/2018 | Hashimoto et al. | |
| 2018/0121799 A1 | 5/2018 | Hashimoto et al. | |
| 2018/0129931 A1 | 5/2018 | Bradbury et al. | |
| 2018/0129937 A1 | 5/2018 | Bradbury et al. | |
| 2018/0129938 A1 | 5/2018 | Xiong et al. | |
| 2018/0137854 A1* | 5/2018 | Perez | G06F 40/35 |
| 2018/0268287 A1 | 9/2018 | Johansen et al. | |
| 2018/0268298 A1 | 9/2018 | Johansen et al. | |
| 2018/0336198 A1 | 11/2018 | Zhong et al. | |
| 2018/0336453 A1 | 11/2018 | Merity et al. | |
| 2018/0349359 A1 | 12/2018 | McCann et al. | |
| 2018/0373682 A1 | 12/2018 | McCann et al. | |
| 2018/0373987 A1 | 12/2018 | Zhang et al. | |
| 2019/0034540 A1* | 1/2019 | Perkins | G06F 16/2228 |
| 2019/0050386 A1* | 2/2019 | Bastide | G06F 40/166 |
| 2019/0080252 A1* | 3/2019 | Shinn | G06F 9/4413 |
| 2019/0130218 A1 | 5/2019 | Albright et al. | |
| 2019/0130248 A1 | 5/2019 | Zhong et al. | |
| 2019/0130249 A1 | 5/2019 | Bradbury et al. | |
| 2019/0130273 A1 | 5/2019 | Keskar et al. | |
| 2019/0130312 A1 | 5/2019 | Xiong et al. | |
| 2019/0130896 A1 | 5/2019 | Zhou et al. | |
| 2019/0188568 A1 | 6/2019 | Keskar et al. | |
| 2019/0213482 A1 | 7/2019 | Socher et al. | |
| 2019/0251168 A1 | 8/2019 | McCann et al. | |
| 2019/0251431 A1 | 8/2019 | Keskar et al. | |
| 2019/0258714 A1 | 8/2019 | Zhong et al. | |
| 2019/0258901 A1 | 8/2019 | Albright et al. | |
| 2019/0258939 A1 | 8/2019 | Min et al. | |
| 2019/0286073 A1 | 9/2019 | Asl et al. | |
| 2019/0295530 A1 | 9/2019 | Asl et al. | |
| 2019/0355270 A1 | 11/2019 | McCann et al. | |
| 2019/0362020 A1 | 11/2019 | Paulus et al. | |
| 2020/0005765 A1 | 1/2020 | Zhou et al. | |
| 2020/0042644 A1* | 2/2020 | Jagan | G06N 3/0445 |
| 2020/0057805 A1 | 2/2020 | Lu et al. | |
| 2020/0065651 A1 | 2/2020 | Merity et al. | |
| 2020/0084465 A1 | 3/2020 | Zhou et al. | |
| 2020/0089757 A1 | 3/2020 | Machado et al. | |
| 2020/0090033 A1 | 3/2020 | Ramachandran et al. | |
| 2020/0090034 A1 | 3/2020 | Ramachandran et al. | |
| 2020/0103911 A1 | 4/2020 | Ma et al. | |
| 2020/0104643 A1 | 4/2020 | Hu et al. | |
| 2020/0104699 A1 | 4/2020 | Zhou et al. | |
| 2020/0105272 A1 | 4/2020 | Wu et al. | |
| 2020/0117854 A1 | 4/2020 | Lu et al. | |
| 2020/0117861 A1 | 4/2020 | Bradbury | |
| 2020/0142917 A1 | 5/2020 | Paulus | |
| 2020/0394509 A1* | 12/2020 | Thomas | G06N 3/0445 |
| 2021/0073333 A1* | 3/2021 | Mont-Reynaud | G10L 15/197 |
| 2021/0117456 A1* | 4/2021 | Katz | G06F 16/3329 |
| 2021/0217409 A1* | 7/2021 | Choi | G10L 15/1822 |

OTHER PUBLICATIONS

Majavacas et al., Improving Lemmatization of Non-Standard Languages with Joint Learning, https://arxiv.org/abs/1903.06939, Mar. 16, 2019, pp. 1-11 (Year: 2019).*

Nicolai et al., Leveraging Inflection Tables for Stemming and Lemmatization, Proceedings of the 5th Annual Meeting of the Assocation for Computational Linguistics, Aug. 7-12, 2016, pp. 1138-1147 (Year: 2016).*

Neural Morphological Tagging of Lemma Sequences for Machine Translation, Proceedings of AMTA 2018, vol. 1: MT Research Track, Mar. 17-21, 2018, pp. 39-53 (Year: 2018).*

Agirre et al. "SEM 2013 shared task: Semantic textual similarity," Association for Computational Linguistics. Second Joint Conference on Lexical and Computational Semantics (*SEM), vol. 1: Proceedings of the Main Conference and the Shared Task, Atlanta, Georgia USA, Jun. 13-14, 2013 pp. 32-43.

Alzantot et al. "Generating natural language adversarial examples," In Proceedings of the 2018 Conference on Empirical Methods in Natural Language Processing, Brussels, Belgium. Association for Computational Linguistics (2018), pp. 2890-2896.

Belinkov et al. "Synthetic and natural noise both break neural machine translation," In International Conference on Learning Representations (2018); arXiv:1711.02173v2 [cs.CL] Feb. 24, 2018.

Steven Bird, et al. Natural Language Processing with Python. O'Reilly Media. 2009.

Bolukbasi et al., "Man is to computer programmer as woman is to homemaker? debiasing word embeddings," In D. D. Lee, M. Sugiyama, U. V. Luxburg, I. Guyon, and R. Garnett, editors, Advances in Neural Information Processing Systems 29, pp. 4349-4357 (2016) Curran Associates, Inc.

Bordia et al. Identifyng and reducing gender bias in word-level language models. In Proceedings of the 2019 Conference of the North American Chapter of the Association for Computational Linguistics: Student Research Work-shop, Minneagolis, Minnesota. Association for Comgutational Linguistics (2019) pp. 7-15.

D. Crystal, "English as a Global Language," Cambridge University Press, Cambridge, United Kingdom (2003).

Devlin et al. "Bert: Pre-training of deep bidirectional transformers for language understanding," arXiv preprint arXiv:1810.04805v2 [cs.CL] May 24, 2019.

Eberhard, et al. Ethnologue: Languages of the World, 22nd edition. SIL International (2019).

Ebrahimi, et al. "HotFlip: White-box adversarial examples for text classification," In Proceedings of the 56th Annual Meeting of the Association for Computational Linguistics (vol. 2: Short Papers), Melbourne, Australia. Association for Computational Linguistics, pp. 31-36, (2018).

Eger, et al. "Text processing like humans do: Visually attacking and shielding nlp systems," In NAACL-HLT. (2019); arXiv:1903.11508v2 [cs.CL] Jun. 10, 2020.

Gardner et al. "AllenNLP: A deep semantic natural language processing platform," (2017); arXiv:1803.07640v2 [cs.CL] May 31, 2018.

Gehring, et al. "Convolutional Sequence to Sequence Learning," In Proc. of ICML (2017); arXiv:1705.03122v3 [cs.CL] Jul. 25, 2017.

Goodfellow, et al. "Explaining and harnessing adversarial examples," In International Conference on Learning Representations (2015); arXiv:1412.6572v3 [stat.ML] Mar. 20, 2015.

Hartshorne, et al. "A critical period for second language acquisition: Evidence from 2/3 million english speakers," Cognition (Aug. 2018) 177:263-277.

(56) References Cited

OTHER PUBLICATIONS

Haznedar. "Missing surface inflection in adult and child L2 acquisition," In Proceedings of the 6th Generative Approaches to Second Language Acquisition Conference (2002): 140-149.
Hern, "Facebook translates 'good morning' into 'attack them', leading to arrest," The Guardian (2017).
Iyyer et al. "Adversarial example generation with syntactically controlled paraphrase networks," In Proceedings of the 2018 Conference of the North American Chapter of the Association for Computational Linguistics: Human Language Technologies, vol. 1 (Long Papers); New Orleans, Louisiana. Association for Computational Linguistics (2018) pp. 1875-1885.
Jia et al. "Adversarial examples for evaluating reading comprehension systems," In Proceedings of the 2017 Conference on Empirical Methods in Natural Language Processing, Copenhagen, Denmark. Association for Computational Linguistics (2017) pp. 2021-2031.
Jin et al. "Is bert really robust? a strong base-line for natural language attack on text classification and entailment"; arXiv:1907.11932v6 [cs:CL] Apr. 8, 2020.
Joshi et al. "SpanBERT: Improving pre-training by representing and predicting spans," arXiv preprint arXiv:1907.10529 (2019).
Braj B. Kachru, Yamuna Kachru, and Cecil Nelson, editors. 2009. The Handbook of World Englishes. Wiley-Blackwell.
Keskar et al. 2019. "CTRL—A Conditional Transformer Language Model for Controllable Generation," arXiv preprint arXiv:1909.05858V2 [cs.CL] Sep. 20, 2019.
Lardiere: "Case and tense in the 'fossilized' steady state," Second language research, Jan. 1998. 14(1):1-26.
May et al. "On measuring social biases in sentence encoders," In Proceedings of the 2019 Conference of the North American Chapter of the Association for Computational Linguistics: Human Language Technologies, vol. 1 (Long and Short Papers); Minneapolis, Minnesota. Association for Computational Linguistics; (2019) pp. 622-628.
Michel et al. "On evaluation of adversarial perturbations for sequence-to-sequence models," In Proceedings of the 2019 Conference of the North American Chapter of the Association for Computational Linguistics: Human Language Technologies, Volume 1 (Long and Short Papers); Association for Computational Linguistics, Minneapolis, Minnesota; (2019) pp. 3103-3114.
Ott et al. "fairseq: A fast, extensible toolkit for sequence modeling" In Proceedings of NAACL-HLT 2019 Demonstrations (2019); arXiv:1904.01038v1 [cs.CL] Apr 1, 2019.
Ott et al. "Scaling neural machine translation," In Proceedings of the Third Conference on Machine Translation: Research Papers, Association for Computational Linguistics, Brussels, Belgium; (2018) pp. 1-9.
Papineni et al. "Bleu: a method for automatic evaluation of machine translation," In Proceedings of the 40th Annual Meeting of the Association for Computational Linguistics; Association for Computational Linguistics; Philadelphia, Pennsylvania, USA, (2002) pp. 311-318.
Peters et al. 2018. "Deep contextualized word representations," In Proceedings of the 2018 Conference of the North American Chapter of the Association for Computational Linguistics: Human Language Technologies, vol. 1 (Long Papers), (2018) pp. 2227-2237, New Orleans, Louisiana. Association for Computational Linguistics.
Maja Popovic, "chrF: character n-gram f-score for automatic MT evaluation," In Proceedings of the Tenth Workshop on Statistical Machine Translation, 2015. pp. 392-395, Lisbon, Portugal. Association for Computational Linguistics.

Matt Post, "A call for clarity in reporting BLEU score," In Proceedings of the Third Conference on Machine Translation: Research Papers, (2018) pp. 186-191, Brussels, Belgium. Association for Computational Linguistics.
Philippe Prévost and Lydia White. "Missing surface inflection or impairment in second language acquisition? evidence from tense and agreement," Second Language Research; (2000) 16:103-133.
Radford et al. "Language models are unsupervised multitask learner," Computer Science (2019).
Rajpurkar et al. "Know what you don't know: Unanswerable questions for SQUAD," In Proceedings of the 56th An-nual Meeting of the Association for Computational Linguistics (vol. 2: Short Papers), pp. 784-789, Melbourne, Australia. Association for Computational Linguistics; arXiv:1806.03822v1 [cs.CL] Jun. 11, 2018
Rajpurkar et al. "SQuAD: 100,000+ questions for machine comprehension of text,"In Proceedings of the 2016 Conference on Empirical Methods in Natural Language Processing; Association for Computational Linguistics, Austin, Texas; (2016) pp. 2383-2392.
Ribeiro et al., "Semantically equivalent adversarial rules for debugging NLP models," In Proceedings of the 56th Annual Meeting of the Association for Computational Linguistics (vol. 1: Long Papers); Association for Comgutational Linguistics, Melbourne, Australia; (2018) pp. 856-865.
Rickford et al., "Language and linguistics on trial: Hearing rachel jeantel (and other vernacular speakers) in the courtroom and beyond," Language, (2016) 92:948-988.
Rudinger et al., "Gender bias in coreference resolution," Proceedings of NAACL-HLT 2018, New Orleans, Louisiana, Jun. 1-6, 2018; pp. 8-14.
Sennrich et al. "Neural machine translation of rare words with subword units," In Proceedings of the 54th Annual Meeting of the Association for Computational Linguistics (vol. 1: Long Papers), Association for Comgutational Linguistics; (2016) pp. 1715-1725.
Seo et al. "Bidirectional attention flow for machine comprehension," In 5th International Conference on Learning Representations, ICLR 2017, Toulon, France; Conference Track Proceedings; (2017) Apr. 24-26, 2017.
Harry Seymour, "The challenge of language assessment for african american english-speaking children: A historical perspective," Seminars in speech and language, (2004) 25:3-12.
Szegedy et al., "Intriguing properties of neural networks," In International Conference on Learning Representations (2014); arXiv:1312.6199v4 [cs.CV] Feb. 19, 2014.
Rachael Tatman. "Gender and dialect bias in YouTube's automatic captions," In Proceedings of the First ACL Workshop on Ethics in Natural Language Processing; Association for Computational Linguistics; Valencia, Spain; (2017) pp. 53-59.
Vaswani et al. "Attention is all you need," In Advances in Neural Information Processing Systems, (2017) pp. 5998-6008; arXiv:1706.03762v5 [cs.CL] Dec. 6, 2017.
Lydia White. "Fossilization in steady state 12 grammars: Persistent problems with inflectional morphology,"Bilingualism: Language and Cognition, (2003) 6:129-141.
Wolf et al. "Huggingface's transformers: State-of-the-art natural language processing," arXiv:1910.03771v5 [cs.CL] Jul. 14, 2020.
Zhang et al. "Adversarial attacks on deep learning models in natural language processing: A survey," arXiv:1901.06796v3 [cs.CL] Apr. 11, 2019.
Zhang et al. "PAWS: paraphrase adversaries from word scrambling," arXiv:1904.01130v1 [cs.CL] Apr. 1, 2019.

* cited by examiner

400

---

Algorithm 1 MORPHEUS
---
Require: Original instance $x$, Label $y$, Model $f$
Ensure: Adversarial example $x'$
  $T \leftarrow \text{TOKENIZE}(x)$
  for all $i = 1, \ldots, |T|$ do
    if $\text{POS}(T_i) \in \{\text{NOUN}, \text{VERB}, \text{ADJ}\}$ then
      $I \leftarrow \text{GETINFLECTIONS}(T_i)$
      $T_i \leftarrow \text{MAXINFLECTED}(I, T, y, f)$
    end if
  end for
  $x' \leftarrow \text{DETOKENIZE}(T)$
  return $x'$
---

*FIG. 4*

Extractive Question Answering

Original: When is the suspended team scheduled to return?
Adversary: When are the suspended team scheduled to returned?
Predictions — Before: 2018    After: No answer Original: Who upon arriving gave the original viking settlers a common identity?
Adversary: Who upon arrives gave the original viking settler a common identities?
Predictions — Before: Rollo    After: almost no foreign settlers

Neural Machine Translation

Original: Israeli warplanes struck a target inside the Syrian port city of Latakia Thursday night, a senior administration official confirms to Fox News.
Adversary: Israeli warplanes strikes a target inside the Syrian port city of Latakia Thursday night, a senior administration official confirms to Foxs News.
Predictions — Before: Un haut responsable de l'administration confirme à Fox News que des avions de combat israéliens ont frappé une cible à l'intérieur de la ville portuaire syrienne de Lattaquié dans la nuit de jeudi.
After: Le président de la République, Nicolas Sarkozy, a annoncé jeudi que le président de la République, Nicolas Sarkozy, s'est rendu en République démocratique du Congo.

*FIG. 5*

SYSTEMS AND METHODS FOR GENERATING NATURAL LANGUAGE PROCESSING TRAINING SAMPLES WITH INFLECTIONAL PERTURBATIONS

RELATED APPLICATIONS

This application claims priority to U.S. Provisional patent Application No. 62/945,647, filed Dec. 9, 2019, which is incorporated by reference herein in its entirety.

TECHNICAL FIELD

The disclosure relates generally to natural language processing (NLP) systems and more specifically to generating NLP training samples with inflectional perturbations for training NLP systems.

BACKGROUND

Artificial intelligence, implemented with neural networks and deep learning models, has demonstrated great promise as a technique for automatically analyzing real-world information with human-like accuracy. In general, such neural network and deep learning models receive input information and make predictions based on the same. Whereas other approaches to analyzing real-world information may involve hard-coded processes, statistical analysis, and/or the like, neural networks learn to make predictions gradually, by a process of trial and error, using a machine learning process.

Neural networks may be applied to natural language processing (NLP). The NLP systems have been widely used in learning complex patterns in language. Such NLP systems are trained with task-specific datasets, e.g., datasets for auto-translation, question-and-answering, and/or the like. Existing NLP systems are mostly trained with data samples that include natural language sentences, based on a standard (often American) English. However, English is a second language to almost two-thirds of the world's population and the accents and grammar which may be used by these individuals often differs from standard English. Even native English speakers may speak in a non-standard dialectal variant rather than the standard English that has been used to train NLP systems. Thus, when the existing NLP systems are trained using standard English data samples, the NLP systems may exhibit linguistic discrimination when used by non-native or non-standard English speakers because the NLP systems either fail to understand or misrepresent their English.

BRIEF DESCRIPTION OF THE DRAWINGS

FIG. 4 is a diagram of an algorithm for generating an adversarial sample with inflectional perturbations from an original data sample, according to some embodiments.

FIG. 5 is a table illustrating examples of adversarial samples with inflectional perturbations generated from original data samples, according to some embodiments.

Figure 1:
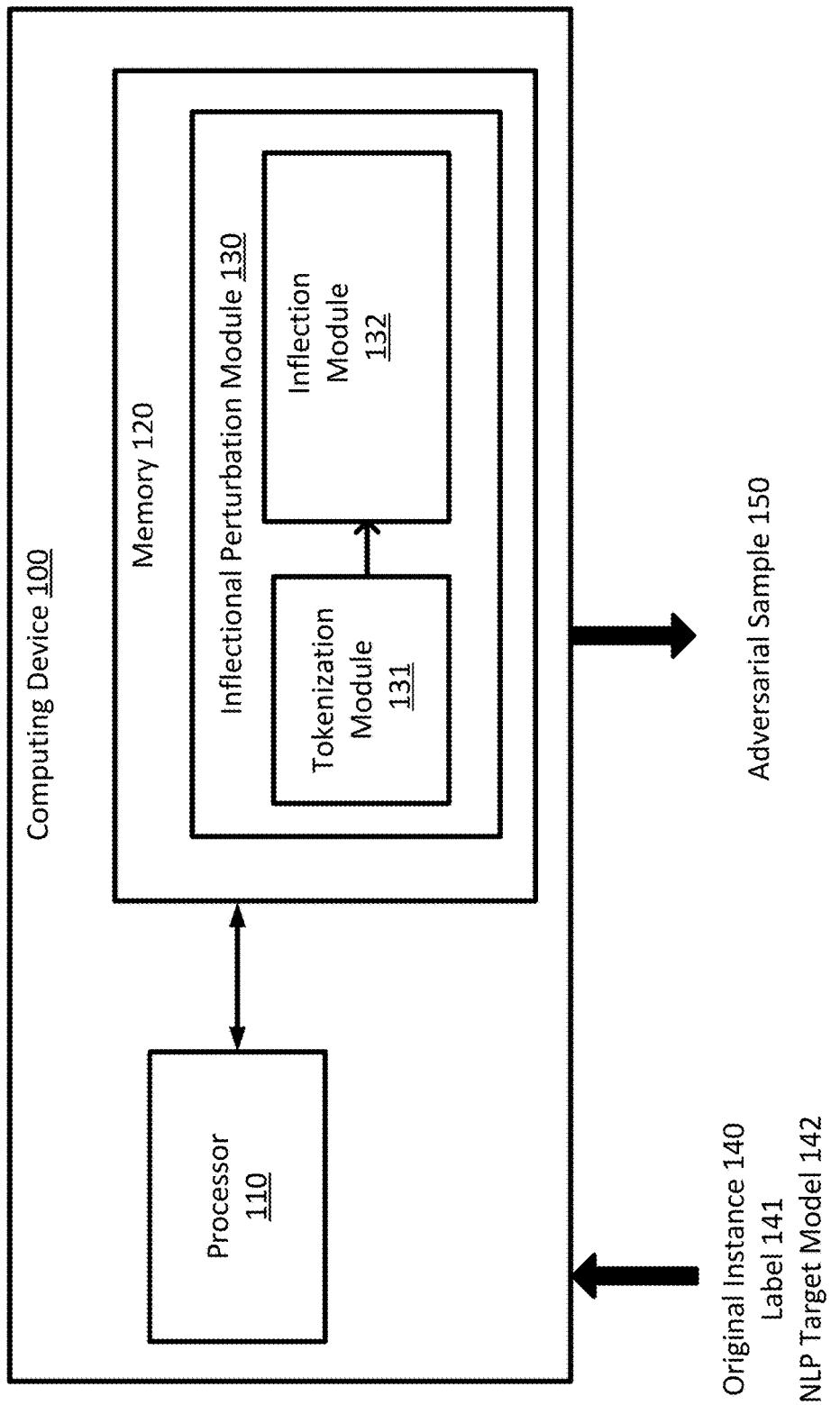
FIG. 1 is a simplified diagram of a computing device for implementing a neural network for generating NLP training samples with inflectional perturbations according to some embodiments.

In the figures and appendix, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Artificial intelligence, implemented with neural networks and deep learning models, has demonstrated great promise as a technique for automatically analyzing real-world information with human-like accuracy. In general, such neural network and deep learning models receive input information and make predictions based on the input information. Natural language processing (NLP) is one class of problems to which neural networks may be applied.

Existing NLP systems are mostly trained from standard English data samples. While a large number of non-native or even native English speakers often exhibit variability in their production of inflectional morphology, such NLP systems may often exhibit linguistic discrimination, either by failing to understand minority speakers or by misrepresenting them.

According to some embodiments, the systems and methods of the disclosure provide for or implement adversarial training to improve a NLP system's robustness. This involves generating adversarial data samples and augmenting existing training data with the adversarial data samples or replacing the clean data samples in the training data with adversarial data samples.

In particular, in view of the need for bias-free NLP systems that are robust to inflectional perturbations and to minimize the chances of the NLP systems propagating linguicism, embodiments disclose generating plausible and semantically similar adversarial samples by perturbing the inflectional morphology of the words in a sentence, where the words in a sentence are training data. The generated adversarial samples are then used to fine tune the NLP system. The fine-turned NLP system can obtain improved robustness against linguistic discrimination.

According to some embodiments, the systems of the disclosure—including the various networks, models, and modules—can be implemented in one or more computing devices.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

FIG. 1 is a simplified diagram of a computing device 100 for generating NLP training samples with inflectional perturbations according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

In some examples, memory 120 may include non-transitory, tangible, machine readable media that includes executable code that when run by one or more processors (e.g., processor 110) may cause the one or more processors to perform the methods described in further detail herein. For example, as shown, memory 120 includes instructions for an inflectional perturbation module 130 that may be used to implement and/or emulate the systems and models, and/or to implement any of the methods described further herein. In some examples, the inflectional perturbation module 130 may be used to receive and handle the input of an original instance x 140, a label y 141 associated as the ground truth with the original instance x 140 and a target model f 142 which can be a neural model for solving a certain NLP task. Original instance x 140 may be a natural language sentence or a natural language question in Standard English, either spoken or written. Example target models f 142 may be pre-trained language models such as BERT (Bidirectional Encoder Representations from Transformers) model, Span-BERT, GPT (Generative Pretrained Transformer) or GPT-2 model, CTRL (Conditional Transformer Language Model), and Transformer-big. These target models f 142 may be used to answer a natural language question, translate a sentence, etc. Inflectional perturbation module 130 may generate an adversarial sample x' 150 from the original instance x 140. The adversarial sample x' 150 may be a natural language sentence with one or more words in inflected form. In some embodiments, the inflectional perturbation module 130 may also handle the iterative training and/or evaluation of the NLP system with a dataset that includes original instances x 140 and adversarial instances x' 150 used for question answering tasks, translation tasks, etc.

In some embodiments, the inflectional perturbation module 130 includes a tokenization module 131 and an inflection module 132. Tokenization module 131 may tokenize the original instance x 140 into tokens. For example, tokenization module 131 may break a natural language sentence in Standard English into individual words with each word being a token or a tokenized representation of the word.

In some embodiments, the inflection module 132 may receive from the tokenization module 131 the tokens or the token representations (e.g., words, phrases, etc.) of the original instance x 140. The inflection module 132 may determine inflected forms and a maximum inflected form of each or one or more tokens. In some examples, the inflectional perturbation module 130, the tokenization modules 131, and inflection module 132 may be implemented using hardware, software, and/or a combination of hardware and software.

As shown, computing device 100 receives input such as original instance x 140 (e.g., a natural language sentence in Standard English, etc.), a label y 141 associated with the original instance x 140 and a target model f 142 which can be a neural model for solving a certain NLP task. The original instance x 140, label y 141, and target model f 142 may be provided to the inflectional perturbation module 130. As discussed above, the inflectional perturbation module 130 operates on the input 140-142 via the tokenization module 131 and the inflection module 132 to generate an output that is adversarial sample x' 150 corresponding to the original instance x 140.

For example, given a target model f 142 and an original instance x 140 for which the ground truth label is y 141, the inflectional perturbation module 130 generates the adversarial sample x' 150 that maximizes the loss function of the target model f 142, as represented below:

$$x' = \arg\max_{x_c} \mathcal{L}(y, f(x_c))$$

where $x_c$ is the adversarial sample 150 generated by perturbing original instance x 140, f(x) is the model's prediction, and $\mathcal{L}(\bullet)$ is the model's loss function.

As discussed above, the tokenization module 131 is configured to receive the original instance x 140 and represent the original instance x 140 as a set of tokens. The inflection module 132 receives the set of tokens representing the original instance x 140 from the tokenization module 131. The inflection module 132 may identify tokens that are nouns, verbs, or adjectives. For each token that may be a noun, a verb, or an adjective, inflection module 132 is configured to find one or more inflected forms. From the inflected forms for each token, inflection module 132 is configured to find the inflected form (adversarial form) that causes the greatest increase in the target model f's 142 loss.

Inflectional perturbations inherently preserve the general semantics of a word since the root remains unchanged. In cases where a word's part of speech (POS) is context-dependent (e.g., a word "duck" may be a verb or a noun), inflection module 132 may restrict perturbations to the original POS to further preserve its original meaning.

Once inflection module 132 identifies the inflected form for each token that is a noun, a verb, or an adjective, inflection module 132 may generate adversarial example x' 150 by combining the inflected forms of each token with other tokens that are not nouns, verbs, or adjectives, and the same order as original instance x 140.

Figure 2:
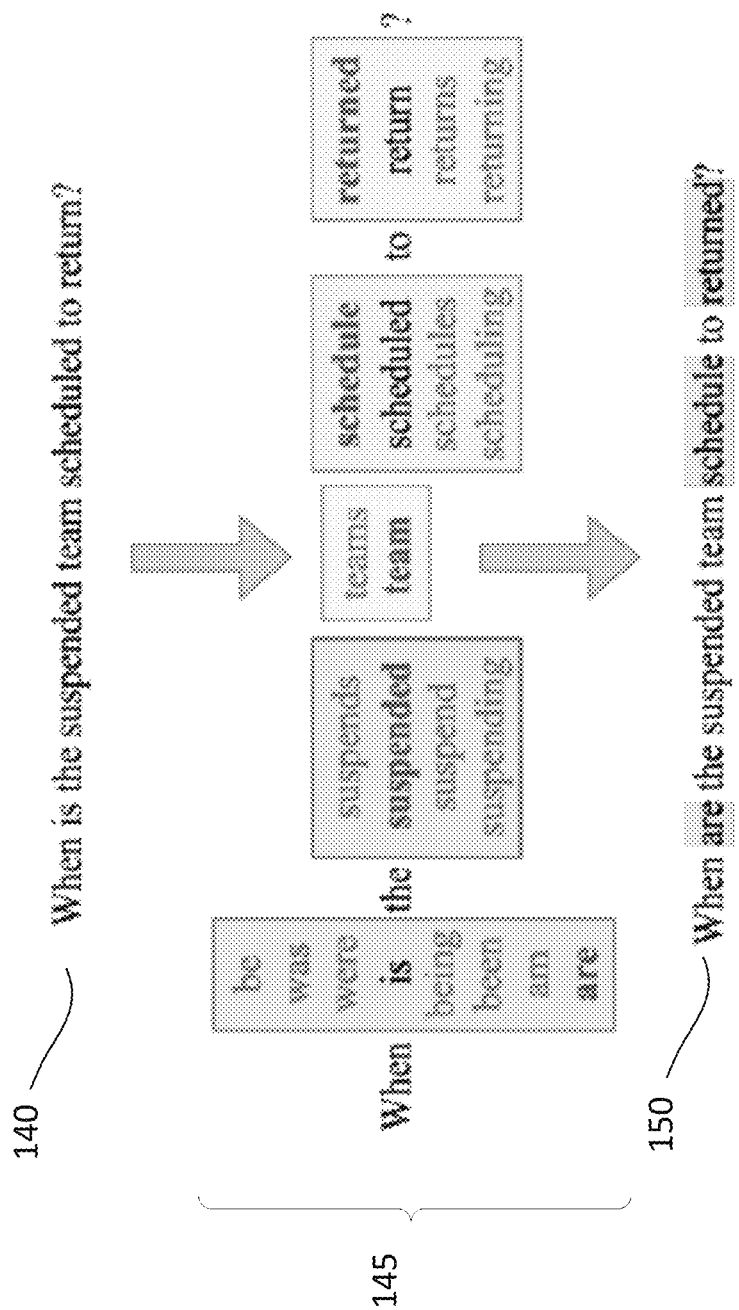
FIG. 2 is a simplified diagram illustrating an adversarial sample with inflectional perturbations generated from an original data sample, according to some embodiments.

FIG. 2 is a simplified diagram illustrating an adversarial sample generated from an original instance, that the modules shown in FIG. 1 generate and/or process, according to some embodiments. As shown in FIG. 2, an example original instance x 140 in Standard English is a natural language sentence "When is the suspended team scheduled to return?" The inflection perturbation module 130 in FIG. 1, may receive this original instance x 140 and identify each word that is a noun, verb, or adjective in the original instance x 140 and identify inflected forms of each word. As illustrated in FIG. 2, the words or tokens that are a noun, verb or adjective are "is", "suspended", "team", schedule," and "returned." As also illustrated in FIG. 2, inflected forms for the word or token "is" are "be", "was", "were", "being", "been", "am", and "are" with the token "are" being the inflected form that maximizes the target model f's 142 loss. In another example illustrated in FIG. 2, for the token "team" the inflected form is "teams" and this inflected form also maximizes the target model f s 140 loss. In another example, illustrated in FIG. 2, for the token "suspended" the inflected form may be "suspends", "suspended", "suspend", and "suspending", with the token "suspended" maximizing the target model f's 142 loss function. Notably, as shown with the token "suspend", the token in the original instance x 140 may be the same token that maximizes the target model f's 140 loss function. In some embodiments, to maximize semantic preservation, the system may only consider inflections belonging to the same universal part of speech as the original word.

In some embodiments, as shown at block 145, the system may perform a greedy search on different tokens that are nouns, verbs, and adjectives to determine inflected forms. One of the inflected forms for each token may be used to generate the adversarial sample 150 that achieves the maximum loss. As illustrated in FIG. 2, the adversarial sample 150 may be "When are the suspended team schedule to returned?" Thus, the resulting adversarial sample 150 is the output that can be used to train the target model f 142 to improve the robustness against linguistic discrimination.

Figure 3:
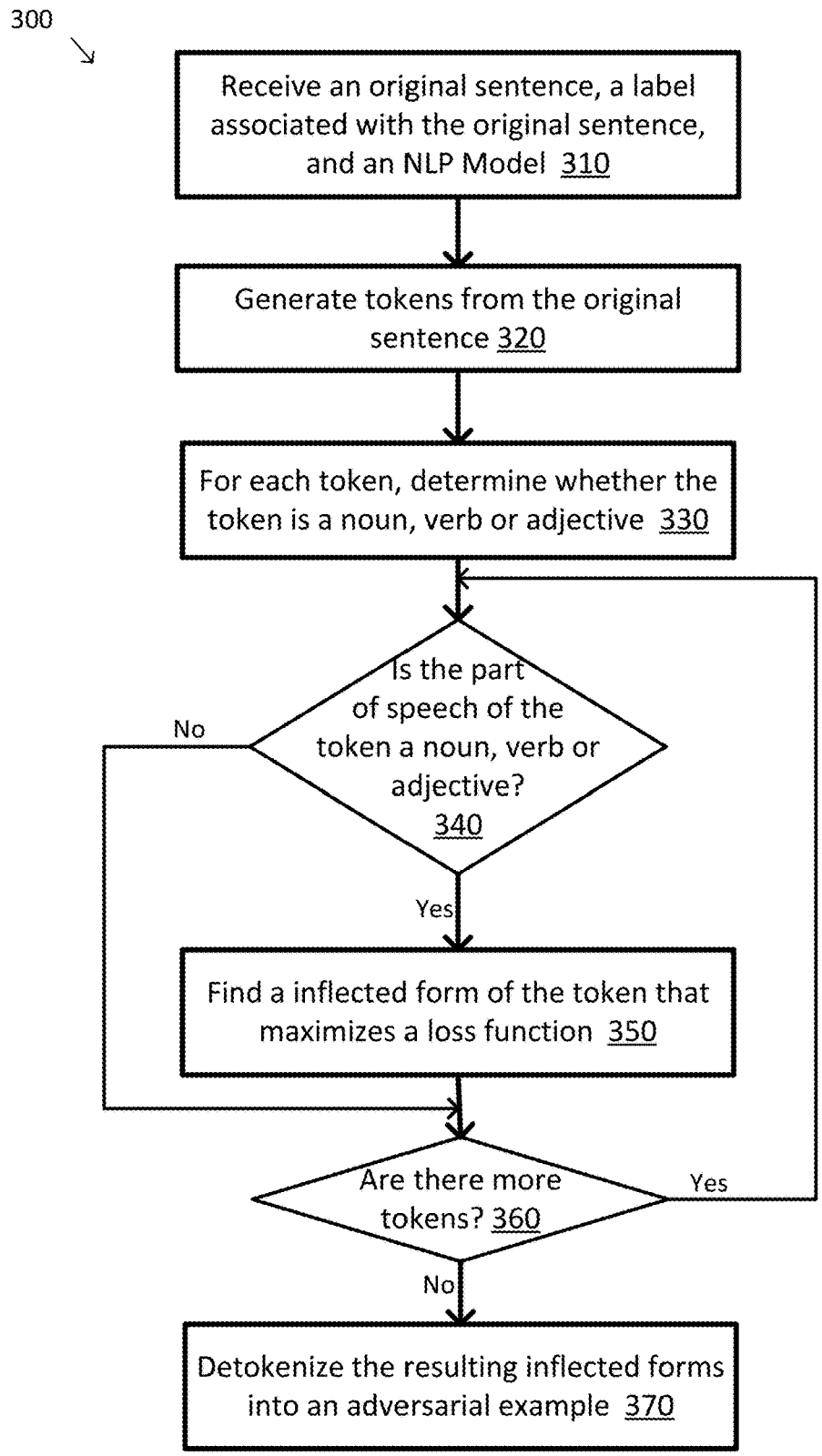
FIG. 3 is a simplified logic flow diagram illustrating a method for generating an adversarial sample with inflectional perturbations from an original data sample, according to some embodiments.

FIG. 3 is a simplified logic flow diagram illustrating a method 300 for generating NLP training adversarial samples with inflectional perturbations, according to some embodiments. One or more of the processes 310-370 of method 300 may be implemented, at least in part, in the form of executable code stored on non-transitory, tangible, machine-readable media that when run by one or more processors may cause the one or more processors to perform one or more of the processes 310-370. In some embodiments, method 300 may correspond to the method used by the inflectional perturbation module 130 to generate an adversarial sample for training a NLP model.

At step 310, the original instance, the label, and the NLP model are received. For example, inflection perturbation module 130 may receive original instance x 140, the label y 141 associated with the original instance x 140, and the target model f 142.

At step 320, a plurality of tokens are generated. For example, tokenization module 131 may generate multiple tokens from words in the original instance x 140.

At step 330, the system determines whether the part-of-speech (POS) of the word associated with the token belongs to a noun, a verb or an adjective. In cases where a word's POS is context-dependent (e.g., "duck" as a verb or a noun), perturbations may be restricted to the original POS which further preserves its original meaning. Notably step 330 is performed for each token generated in step 310.

At step 340, when the POS of the token is a noun, verb or adjective, method 300 proceeds to step 350. Method 300 may proceed to step 370 when the POS of the word associated with the token does not belong to a noun, verb or adjective. Notably step 340 is performed for each token that is associated with the POS that is a noun, verb, or adjective.

At step 350, an inflected form of the token that causes the greatest increase in a loss function of the target model f 142 is identified. The inflected form of the token may be identified in parallel or sequentially. In one embodiment, each token may be modified in parallel and independently from the other tokens. In another embodiment, each token is modified sequentially such that the increase in loss is accumulated as the inflection module 132 iterates over the tokens.

At step 360, if there are more tokens to be processed, method 300 proceeds to 330 to repeat steps 330-350. Otherwise, if all tokens have been processed at step 360, method proceeds to step 370. At step 370, the inflected forms of tokens identified in step 350 are detokenized into adversarial sample x' 150. The tokens that were not identified as having a POS that is a verb, noun or adjective are also detokenized into the adversarial sample x' 150. Accordingly, the adversarial sample x' 150 is a combination of original words that do not have a POS that is a verb, noun, or adjective and inflected forms of the words that were identified as having a POS that is a verb, noun, or adjective. With reference to FIG. 2, an example adversarial sample 150 may be "when are the suspended team schedule to returned?"

FIG. 4 illustrates an algorithm 400 for generating one or more adversarial samples, according to some embodiments. The algorithm 400 may include some or all steps described in method 300 in FIG. 3. In some embodiments, algorithm 400 can be implemented or performed by inflectional perturbation module 130.

As illustrated in FIG. 4, algorithm 400 receives input that includes original instance x 140 (original instance x), the label y 141 (label y) associated with the original instance x 140, and the target model f 142 (model f). As illustrated in FIG. 4, the "TOKENIZE" function identifies tokens in the original instance x 140. Then, for each token that is a noun, verb or adjective, algorithm 400 determines inflected forms using the "GETINFLECTIONS" function. Algorithm 400 then uses the "MAXINFLECTED" function, determined inflected forms, the label y 141, and the target model f 142 to determine the inflected form that maximizes the loss function for the target model f 142. Using the inflected forms generated from tokens that have a POS as a noun, verb or adjective and original words from tokens that do not have the POS as a noun, verb or adjective, algorithm 400 generates adversarial sample x' 150.

There may be various approaches for determining the inflected form that caused the greatest increase in target model f s 142 loss. One approach may be to modify each token into its inflected form independently from the other tokens in parallel. Another approach is to modify each token into its inflected form sequentially such that the increase in loss is accumulated as the inflection module 132 iterates over the tokens. An advantage of the parallel approach is that it is possible, in some embodiments, to increase the speed of identifying adversarial sample x' 150 by t times, where t is the number of tokens which are nouns, verbs, or adjectives. However, because current state-of-the-art models may rely on contextual representations, the sequential approach is likely to be more effective in finding combinations of inflectional perturbations that cause major increases in the loss.

In some embodiments, algorithm 400 may generate inflected forms by first lemmatizing the token before the token is inflected. Also, in order to increase overall inflectional variation in the set of adversarial samples, GET-INFLECTIONS function may shuffle the generated inflected forms before returning the inflected forms. While this may induce misclassification, shuffling also prevents overfitting during adversarial fine-tuning.

In some embodiments, the routine or method for generating inflected forms may receive user input that specifies whether inflected forms may be constrained to the same universal part of speech. That is, algorithm 400 may constrain the search for inflected forms to inflections belonging to the same universal part of speech (e.g., noun for noun, verb for verb, adjective for adjective). For example, suppose a token is the word "duck". Depending on the context, "duck" may either be a verb or a noun. In the context of the sentence "There's a jumping duck", "duck" is a noun. Therefore, algorithm 400 may select inflected forms for the token "duck" that are associated with nouns. This has a higher probability of preserving the sentence's semantics compared to most other approaches, like character and word shuffling or synonym swapping, since the root word and its position in the sentence remains unchanged.

In some embodiments, algorithm 400 may terminate early. This may occur once algorithm 400 identifies the adversarial sample x' 150 that may induce target model f 142 to fail.

Some examples of computing devices, such as computing device 100 may include non-transitory, tangible, machine readable media that include executable code that when run by one or more processors (e.g., processor 110) may cause the one or more processors to perform the processes of methods 300 or algorithm 400. Some common forms of machine readable media that may include the processes of method 300 or algorithm 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

FIG. 5 illustrates a table 500 showing some adversarial samples that can be obtained using method 300 or algorithm 400 on various machine reading comprehension and translation models f 142, such as BERT (top row in table 500), Span-BERT (middle row in table 500), and Transformer-big (bottom row in table 500). While not perfect grammatically, it is plausible for second language (L2) English speakers to produce such sentences.

In some embodiments, adversarial samples x' 150 may be used to train target models f 142 to become more robust against inflectional errors, such as errors resulting from a non-native speaker speaking English or from a speaker speaking in a non-standard English. In some embodiments, the entire target models f 142 may not need to be retrained using the entire dataset that includes clean samples and adversarial samples x' 150. Instead, an already trained target models f 142 may be fine-tuned by passing adversarial samples x' 150 through target models f 142 for a training epoch. For example, fine-tuning the pre-trained model for just a single epoch is sufficient to achieve significant robustness to inflectional perturbations yet still maintain good performance on the clean evaluation set.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of generating an adversarial sample with inflectional perturbations for training a natural language processing (NLP) system, the method comprising:
receiving an input that is a natural language question;
generating a plurality of tokens from the natural language question;
determining an inflected form of each token in the plurality of tokens, wherein the inflected form for each token maximizes a loss function of the NLP system; and
generating the adversarial sample of the natural language question by detokenizing inflected forms of the plurality of tokens.

2. The method of claim 1, further comprising:
training the NLP system using the generated adversarial sample of the natural language question, wherein the trained NLP system generates answers to natural language questions that are in a nonstandard or dialectal variant of a language.

3. The method of claim 1, further comprising:
generating a plurality of adversarial samples including the adversarial sample from a plurality of natural language questions, including the natural language question; and
fine-tuning the NLP system that has been previously trained using the plurality of adversarial samples.

4. The method of claim 1, wherein the determining further comprises determining the inflected form of each token in the plurality of tokens that is associated with a part of speech that is a noun, an adjective, or a verb.

5. The method of claim 4, wherein the generating the adversarial sample further comprising generating the adversarial sample using the inflected form of each token in the plurality of tokens that is associated with the part of speech that is the noun, the adjective, or the verb and using other tokens in the plurality of tokens that are not associated with the part of speech that is the noun, the adjective, or the verb.

6. The method of claim 1, wherein the NLP system is structured as a neural network that receives a spoken natural language question and generates an answer.

7. The method of claim 1, wherein the inflected form of each token is the same part of speech as the each token.

8. A system of generating an adversarial sample with inflectional perturbations for training a natural language processing (NLP) system, the system comprising:
an inflection perturbation module stored in memory and executing on a processor and configured to:
receive an input that is a natural language question;
generate a plurality of tokens from the natural language question;
determine an inflected form of each token in the plurality of tokens, wherein the inflected form for each token maximizes a loss function of the NLP system; and
generate the adversarial sample of the natural language question by detokenizing inflected forms of the plurality of tokens.

9. The system of claim 8, wherein the NLP system is configured to be trained using the generated adversarial sample of the natural language question, wherein the trained NLP system is configured to generate answers to natural language questions that are in a nonstandard or dialectal variant of a language.

10. The system of claim 8, wherein the inflection perturbation module is further configured to:
generate a plurality of adversarial samples including the adversarial sample from a plurality of natural language questions, including the natural language question; and
fine-tune the NLP system that has been previously trained using the plurality of adversarial samples.

11. The system of claim 8, wherein to determine the inflected form of each token the inflection perturbation module is further configured to determine the inflected form of each token in the plurality of tokens that is associated with a part of speech that is a noun, an adjective, or a verb.

12. The system of claim 8, wherein to generate the adversarial sample the inflection perturbation module is further configured to generate the adversarial sample using the inflected form of each token in the plurality of tokens that is associated with that the part of speech that is the noun, the adjective, or the verb and using other tokens in the plurality of tokens that are not associated with the part of speech that is the noun, the adjective, or the verb.

13. The system of claim 8, wherein the inflected form of each token is the same part of speech as the each token.

14. A non-transitory machine-readable medium having stored thereon machine-readable instructions executable to cause a machine to perform operations that generating an adversarial sample with inflectional perturbations for training a natural language processing (NLP) system, the operations comprising:
receiving an input that is a natural language sentence;
generating a plurality of tokens from the natural language sentence;
determining an inflected form of each token in the plurality of tokens, wherein the inflected form for each token maximizes a loss function of the NLP system; and
generating the adversarial sample of the natural language sentence by detokenizing inflected forms of the plurality of tokens.

15. The non-transitory machine-readable medium of claim 14, wherein the machine is further configured to perform the operations comprising:
training the NLP system using the generated adversarial sample of the natural language question, wherein the trained NLP system generates answers to natural language questions that are in a nonstandard or dialectal variant of a language.

16. The non-transitory machine-readable medium of claim 14, wherein the machine is further configured to perform the operations comprising:
generating a plurality of adversarial samples including the adversarial sample from a plurality of natural language questions, including the natural language question; and
fine-tuning the NLP system that has been previously trained using the plurality of adversarial samples.

17. The non-transitory machine-readable medium of claim 14, wherein to determine the inflected form of each token the machine is further configured to perform the operations comprising determining the inflected form of each token in the plurality of tokens that is associated with a part of speech that is a noun, an adjective, or a verb.

18. The non-transitory machine-readable medium of claim 17, wherein to generate the adversarial sample the machine is further configured to perform the operations comprising generating the adversarial sample using the inflected form of each token in the plurality of tokens that is associated with the part of speech that is the noun, the adjective, or the verb and using other tokens in the plurality of tokens that are not associated with the part of speech that is the noun, the adjective, or the verb.

19. The non-transitory machine-readable medium of claim 14, wherein the NLP system is structured as a neural network that receives a spoken natural language sentence and generates a translation.

20. The non-transitory machine-readable medium of claim 14, wherein the inflected form of each token is the same part of speech as the each token.

* * * * *